United States Patent [19]

Manzarek

[11] Patent Number: 4,937,852
[45] Date of Patent: Jun. 26, 1990

[54] CORDED TO CORDLESS TELEPHONE CONVERTER

[75] Inventor: William Manzarek, Canoga Park, Calif.

[73] Assignees: Margaret Weiser; Issac Weiser, both of Tarzana, Calif.

[21] Appl. No.: 161,680

[22] Filed: Feb. 29, 1988
(Under 37 CFR 1.47)

[51] Int. Cl.$^5$ .............................. H01Q 7/04
[52] U.S. Cl. ........................ 379/61; 379/58; 379/63
[58] Field of Search ..................... 379/61, 58, 63

[56] References Cited

U.S. PATENT DOCUMENTS

| | | | |
|---|---|---|---|
| 1,639,773 | 8/1927 | Hamilton | 379/58 |
| 1,904,567 | 4/1933 | Taylor | 379/58 |
| 2,820,108 | 1/1958 | Kass | 379/58 |
| 2,901,543 | 8/1959 | Braak | 379/58 |
| 3,711,647 | 1/1973 | Boyer . | |
| 3,919,491 | 11/1975 | Luce | 379/61 |
| 4,053,717 | 10/1977 | Snider . | |
| 4,291,197 | 9/1981 | Yonaga . | |
| 4,332,981 | 6/1982 | Palombi et al. . | |
| 4,467,140 | 8/1984 | Fathauer et al. . | |
| 4,471,166 | 9/1984 | Cripps . | |
| 4,538,028 | 8/1985 | Gazzoli et al. . | |
| 4,538,029 | 8/1985 | Gazzoli et al. . | |
| 4,555,592 | 11/1985 | Deinzer . | |
| 4,691,338 | 9/1987 | Makino | 379/61 |
| 4,752,949 | 6/1988 | Steinbeck et al. | 379/61 |
| 4,839,918 | 6/1989 | Hata | 379/61 |

*Primary Examiner*—Robert Lev
*Attorney, Agent, or Firm*—Cislo & Thomas

[57] ABSTRACT

A converter device for enabling a standard, corded telephone to function as a cordless telephone, said converter comprising radio-linking means interposable between said standard telephone and a telephone transmission line.

6 Claims, 2 Drawing Sheets

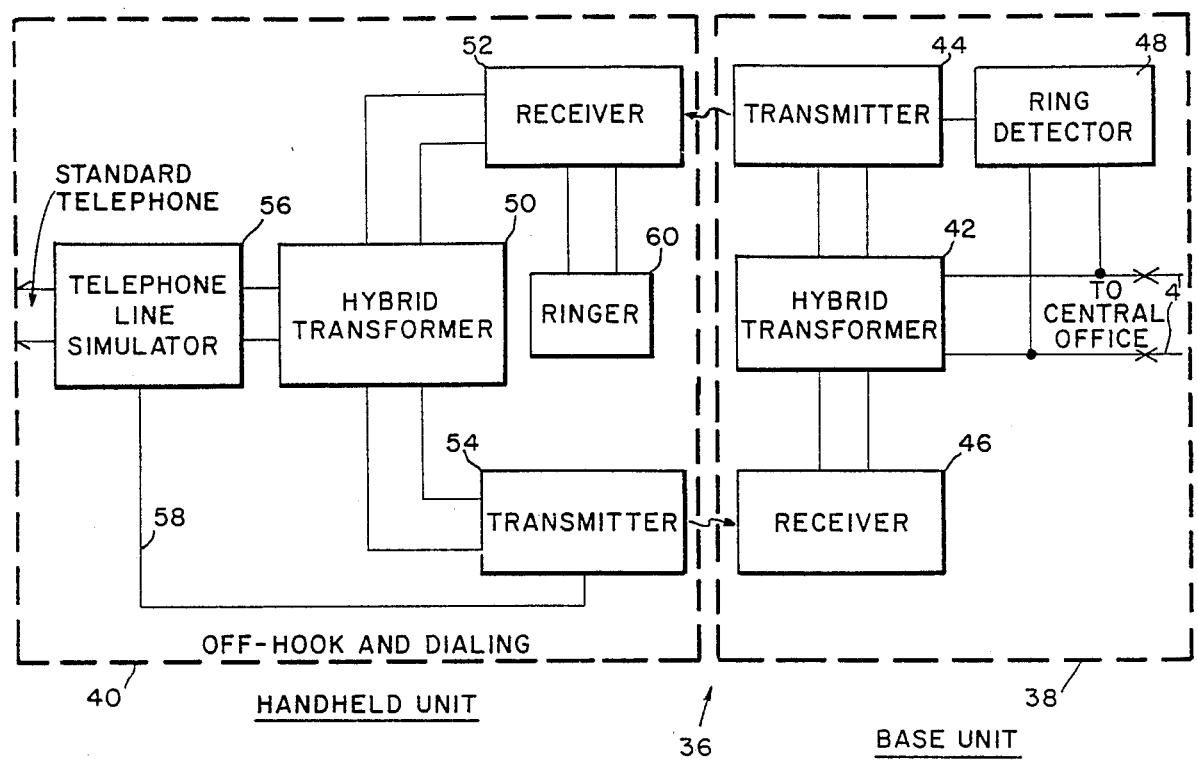
Fig. 3.
Fig. 4.
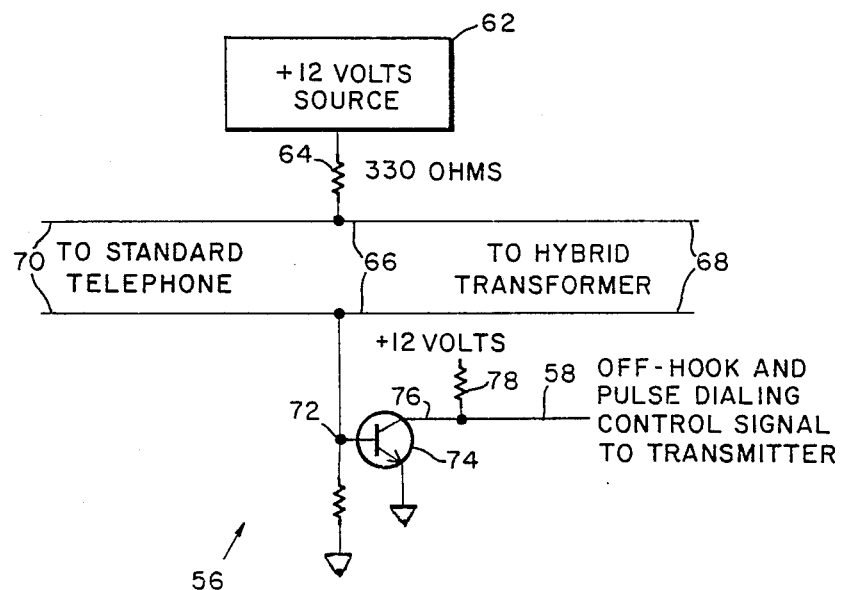

CORDED TO CORDLESS TELEPHONE CONVERTER

BACKGROUND OF THE INVENTION

This invention relates to telephones and is particularly directed to a device for converting standard or corded telephones to have the range and flexibility of cordless telephones.

With the de-regulation of the telephone market, a great variety of telephones have become available to the customer, including numerous combinations of style, color and features. However, even with the available varieties, it is often found that the specific combination of features desired by a particular customer is not available. For example, among the various types of telephones available are cordless (radio-linked) phones, speaker phones and phones with built-in answering devices. Combinations of these are also available. However, conventionally, the speaker and answering features are built into the base unit and the cordless feature is available only for the handset.

BRIEF SUMMARY AND OBJECTS OF INVENTION

These disadvantages of prior art telephones are overcome with the present invention and means are provided which permit any standard, residential-type, corded telephone to be converted to use as a cordless telephone. Moreover, this conversion can be accomplished without interfering with whatever other features the "corded" telephone may have.

The advantages of the present invention are preferably attained by providing a radio-link converting device interposable between a standard telephone and its associated transmission line to permit the "corded" telephone to function as a cordless phone.

Accordingly, it is an object of the present invention to provide improved telephones.

Another object of the present invention is to provide means for permitting standard telephones to function as cordless telephones.

A further object of the present invention is to provide corded telephones with the range and flexibility of cordless telephones.

An additional object of the present invention is to provide means for converting standard telephones to function as cordless telephones.

A specific object of the present invention is to provide radio-link converter means interposable between a standard telephone and its associated transmission line to permit the "corded" telephone to function as a cordless telephone.

These and other objects and features of the present invention will be apparent from the following detailed description, taken with reference to the figures of the accompanying drawing.

BRIEF DESCRIPTION OF DRAWING

FIG. 3 is a diagrammatic representation showing the converting device of the present invention interposed between the standard telephone of FIG. 1 and its associated transmission line.

FIG. 4 is a diagrammatic representation of the transmission line simulator of FIG. 3

DETAILED DESCRIPTION OF INVENTION

Figure 1:
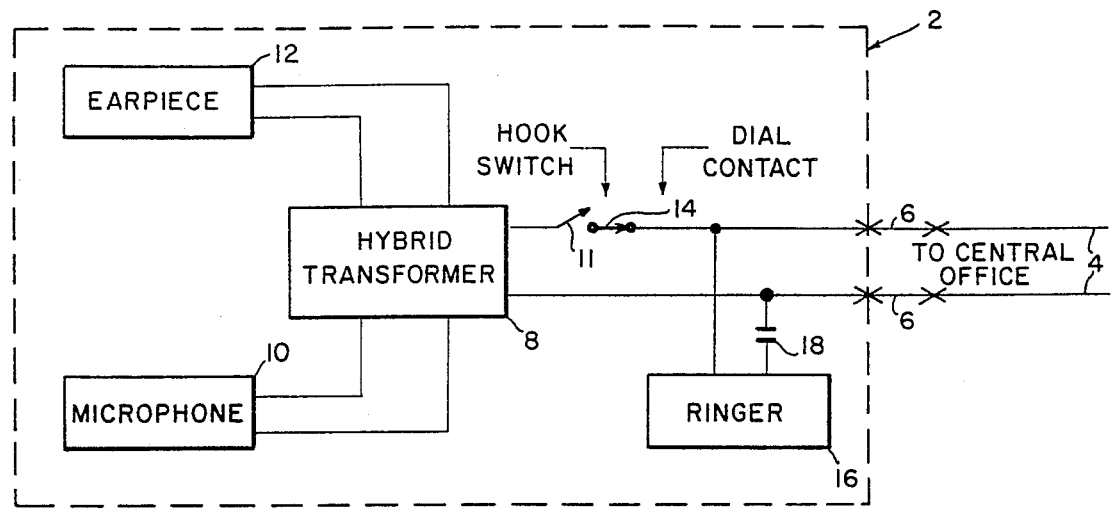
FIG. 1 is a diagrammatic representation of the circuit of a standard corded telephone of the prior art.

In that form of the present invention chosen for purposes of illustration in the drawing, FIG. 1 is a diagrammatic representation of the circuit of a typical corded telephone, indicated generally at 2, which is connected to a transmission line 4 comprising a two-wire line which carries incoming and outgoing speech signals from the central office to a wall box, not shown, in the room where the standard telephone 2 is located. The telephone 2 is connected to the wall box by a conventional phone cord 6 which carries the speech signals from the transmission line 4 to the corded telephone 2.

Within the telephone 2, the speech signals are separated by a hybrid transformer 8, or an electrical equivalent, and are connected by the transformer 8 to either the microphone 10 or the earpiece 12 of the telephone 2, as appropriate. Conventionally, the microphone 10 and earpiece 12 will be mounted in a handset, while the remainder of the circuitry is housed within a cradle unit. In use, removal of the handset from the cradle will close a suitable hook switch 11 to activate the telephone 2. However, numerous variations of this arrangement are well known in the art. Microphone 10 may generate the outgoing signal, as in the case of a carbon microphone, or, in the case of a dynamic or electric type microphone, may drive a suitable amplifier, not shown, which provides appropriate signals to the hybrid transformer 8. Similarly, the earpiece 12 may be driven directly by the incoming signals from the hybrid transformer 8 or by an intermediate amplifier, if desired.

Dialing is accomplished by suitable means, indicated as dialing contact 14, which functions either by interrupting the current flowing via the transmission line 4 to the central office 4 in a standard pattern or by transmitting standard pairs of tones, as in DTMF dialing. The current interruption dialing was historically accomplished by a rotary dial, but now is often done by electronic circuitry connected to a numeric keypad or an electronic memory. The tones for DTMF dialing are generated either by a simple oscillator connected to a keypad or by more sophisticated electronic circuitry which may also include memory functions. Finally, the standard telephone 2 contains a ringer 16 which is capacitively coupled to the telephone line, as indicated at 18, and rings when a high voltage (about 100 volts), low frequency (about 26 hertz) ring signal is received. The ringer 16 may be a mechanical ringer or an electrical circuit driving some sort of transducer.

The standard telephone 2, described above, is conventional in the prior art and the details thereof do not form a part of the present invention. For purposes of the present invention, it is important merely that the corded telephone 2 contain some components which perform the functions described above and that it be designed to connect to and operate on a conventional two-wire telephone transmission line, such as that indicated at 4 in FIG. 1.

Figure 2:
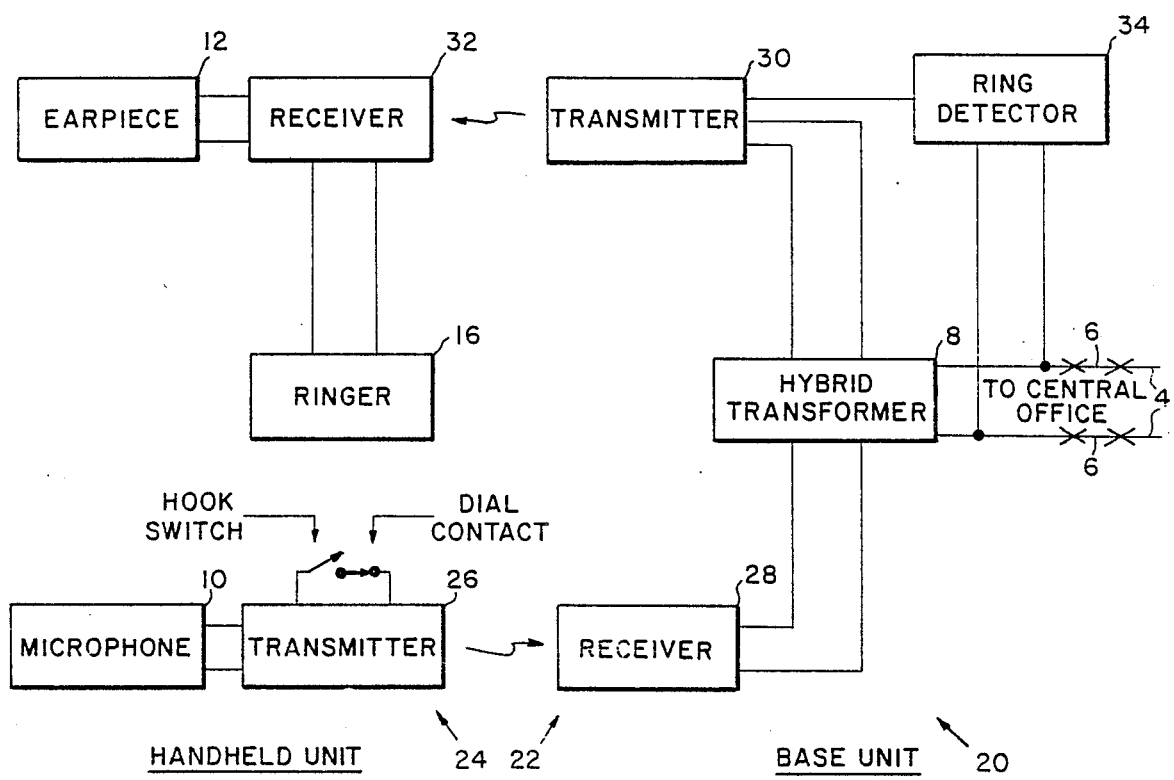
FIG. 2 is a diagrammatic representation of the circuit of a cordless telephone of the prior art.

FIG. 2 is a diagrammatic representation of the circuit of a prior art cordless telephone, indicated generally at 20, having a base unit 22 and a portable unit 24 which are coupled by a two-way radio link. For convenience, those components of the cordless telephone 20 of FIG. 2 which correspond to components of the standard telephone 2 of FIG. 1 have been given similar callout numbers. It will be seen that the circuits of FIG. 1 and FIG. 2 are similar, except that a first radio transmitter 26 and receiver 28 have been interposed between the microphone 10 and the hybrid transformer 8 and a second radio transmitter 30 and receiver 32 have been interposed between the hybrid transformer 8 and the earpiece 12.

The operation of the cordless telephone 20 of FIG. 2 may be easily understood by considering it as a modification of the standard telephone 2 of FIG. 1 wherein the connections between the microphone 10, earpiece 12 and hybrid transformer 8 are effected by two-way radio link formed by transmitters 26 and 30 and receivers 28 and 32. Since the dialing signals are audio tones, they are easily passed from the portable unit 24 to the base unit 20 in the same way as speech signals. If pulse dialing is desired, interruption of the current in the transmission line 4 is accomplished by keying the transmitter 26 in the portable unit 24 which causes the receiver 28 in the base unit 22 to interrupt the signal to the hybrid transformer 8. Ring control may be accomplished by including a ring detector 34 in the base unit 22 which detects the incoming ring signal and serves to pass the ring signal through transmitter 30 to the ringer 16 in the portable unit 24.

Refinements to the cordless telephone circuit of FIG. 2 may include means for transmitting special code signals to prevent interference or unauthorized calling or answering by nearby units using the same radio frequencies. Moreover, it should be understood that the cordless telephone 20 of FIG. 2 is conventional and the details thereof do not constitute part of the present invention.

As indicated above, the purpose of the present invention is to provide a conventional corded telephone, such as that shown in FIG. 1, with the range and flexibility of a cordless telephone. To accomplish this, the phone cord 6 of the standard telephone circuit of FIG. 1 is replaced by the converter device, indicated generally at 36 in FIG. 3.

As shown, the converter device 36 comprises a base unit 38, which is connected to the conventional transmission line 4, and a portable unit 40, which is connected to the standard telephone 2 in lieu of the phone cord 6 of FIG. 1. The base unit 38 comprises a first hybrid transformer 42, similar to the hybrid transformer 8 of FIG. 1, together with a radio transmitter 44, a radio receiver 46 and a ring detector 48, similar to the ring detector 34 of FIG. 2.

The portable unit 40 comprises a second hybrid transformer 50, similar to the hybrid transformer 8 of FIG. 1, which receives signals from a radio receiver 52 that is radio-coupled to the transmitter 44 of the base unit 36. The hybrid transformer 50 of the portable unit 40 also serves to output signals to a radio transmitter 54 which, in turn, is radio-coupled to the receiver 46 of the base unit 36. The hybrid transformer 50 of the portable unit 40 also passes signals to and from a suitable telephone line simulator 56, such as that described below and illustrated in FIG. 4. The standard telephone 2 can be connected to the telephone line simulator 56 of the portable unit 40, in the same way that it was connected to the transmission line 4 in FIG. 1, and will function in substantially the same manner as described with respect to FIG. 1.

Electric current must be supplied to activate the telephone 2 and this current must be monitored to determine when the handset of the telephone 2 is removed from the cradle, so as to turn on the transmitter 54 of the portable unit 40 and to handle the pulse dialing function. This is accomplished through line 58, as described below respect to FIG. 4. For simplicity and low power consumption, a separate ringer 60 has been included in the portable unit 40 to be activated by a ring signal detected by the ring detector 48 of the base unit 38 which passes a signal through base unit radio transmitter 44 and portable unit radio receiver 52 to the ringer 60. However, if desired, high voltage circuitry could, obviously, be included to permit use of the ringer 16 in the telephone 2.

FIG. 4 is a diagrammatic representation of the circuit of the telephone line simulator 56. As shown, a 12 volt source 62 supplies the current required for standard telephones through a 330 ohm resistor 64 to a two-wire transmission system 66. This results in a current through the two-wire system 66 of about 25 milliamperes, which is within the normal operating range for standard telephones. Obviously, other voltage and resistance values could be used, if desired, to result in a current suitable for a standard telephone. End 68 of the two-wire system 66 is connected to the hybrid transformer 50 of the portable unit 40 of FIG. 3, while end 70 of the two-wire system 66 is connected to a standard telephone plug, such as would be used to connect the standard telephone 2 to the transmission line 4 in the circuit of FIG. 1.

When the handset of the telephone 2 is removed from its cradle, the hook switch 11 will be closed, causing current to flow from source 62 through the resistor 64, the two-wire system 66, the telephone 2 and the base 72 of the transistor 74 of the telephone line simulator 56. This will cause the voltage of the collector 76 of transistor 74 to drop from 12 volts to a fraction of a volt. The value of the collector resistor 78 is chosen such that this voltage drop will cause the transistor 74 to saturate. Consequently, the signal at the collector 76 of transistor 74 can be supplied through line 58 to the transmitter 54 of the portable unit 40 to provide the "off-hook" and pulse dialing signals.

The details of the various radio transmitters and receivers, as well as any battery charging circuitry, have not been shown as numerous variations of these are available and are well known in the art. In addition, numerous other variations and modifications may, obviously, be made without departing from the present invention. Therefore, it should be clearly understood that the form of the present invention described above and shown in the accompanying drawing is illustrative only and is not intended to limit the scope of the present invention.

What is claimed is:

1. A converter device for enabling a standard corded telephone to function as a cordless telephone, said converter comprising:

a base unit containing a first hybrid transformer connectable to a standard two-wire telephone transmission line, a first radio transmitter connected to receive signals from said first hybrid transformer, and a first radio receiver connected to send signals to said first hybrid transformer; and a portable unit containing a second hybrid transformer, a second radio receiver tuned to receive radio signals from said first transmitter in said base unit and connected to send signals to said second hybrid transformer, a second radio transmitter connected to receive signals from said second hybrid transformer and tuned to transmit signals to said first radio receiver in said base unit, and telephone line simulator means connected to said second hybrid transformer and connectable to said standard telephone to pass signals between said standard telephone and said second hybrid transformer.

2. The converter device of claim 1 further comprising:
a ring detector contained in said base unit connected to receive ring signals being supplied to said first hybrid transformer and to pass corresponding ring signals to said first radio transmitter; and
a ringer contained in said portable unit connected to receive transmitted equivalents of said corresponding ring signals from said second radio receiver and providing an audible signal in response thereto.

3. The converter device of claim 1 wherein:
said telephone line simulator means comprises:
a source of electrical energy; a two-wire transmission system; a resistor connected between said source and transmission system, the values of said source and said resistor being selected to provide an electrical current in said transmission system within the normal operating range of said standard telephone;
a transistor having the base electrode thereof connected between said transmission system and ground, its emitter electrode connected to ground and its collector electrode connected to said source and to said second radio transmitter.

4. The device of claim 3 wherein:
said source of electrical energy comprises a 12-volt power supply, and the value of said resistor is approximately 330 ohms.

5. The converter of claim 1 further comprising:

a ring detector contained in said base unit connected to receive ring signals being supplied to said first hybrid transformer and to pass corresponding ring signals to said first radio transmitter; and
means contained in said portable unit connected to said second radio receiver and to said second hybrid transformer to receive transmitted equivalents of said corresponding ring signals from said second radio receiver and responsive thereto to apply a signal through said second hybrid transformer to actuate the ringer of said standard telephone.

6. The combination of a standard telephone, a telephone transmission system, and a converter device; said converter device comprising:
a base unit containing a first hybrid transformer connectable to a standard two-wire telephone transmission line, a first radio transmitter connected to receive signals from said first hybrid transformer, and a first radio receiver connected to send signals to said first hybrid transformer; and
a portable unit containing a second hybrid transformer, a second radio receiver tuned to receive radio signals from said first transmitter in said base unit and connected to send signals to said second hybrid transformer, a second radio transmitter connected to receive signals from said second hybrid transformer and tuned to transmit signals to said first radio receiver in said base unit, and telephone line simulator means connected to said second hybrid transformer and connectable to said standard telephone to pass signals between said standard telephone and said second hybrid transformer.

* * * * *